United States Patent [19]
Roeckner et al.

[11] Patent Number: 5,939,693
[45] Date of Patent: Aug. 17, 1999

[54] POLYNOMIAL CALCULATOR DEVICE, AND METHOD THEREFOR

[75] Inventors: William Roeckner, Carpentersville, Ill.; Timothy Rueger, Austin, Tex.; Walter Czarnocki, Hoffman Estates, Ill.

[73] Assignee: Motorola Inc., Schaumburg, Ill.

[21] Appl. No.: 09/017,463

[22] Filed: Feb. 2, 1998

[51] Int. Cl.$^6$ ................................................. G06F 11/10
[52] U.S. Cl. ......................... 235/61 P; 235/61 F; 371/30; 371/22.5; 371/22.6
[58] Field of Search ............................... 235/61 F, 61 P; 371/30, 22.5, 22.6

[56] References Cited

U.S. PATENT DOCUMENTS

| | | | |
|---|---|---|---|
| 3,648,236 | 3/1972 | Burton | 340/146 |
| 3,771,126 | 11/1973 | Apple, Jr. | 340/146 |
| 4,122,308 | 10/1978 | Weinberger et al. | 179/7.1 |
| 4,498,175 | 2/1985 | Nagumo et al. | 371/37 |
| 4,574,361 | 3/1986 | Imagawa et al. | 364/761 |
| 4,659,876 | 4/1987 | Sullivan et al. | 379/96 |
| 4,782,490 | 11/1988 | Tenengolts | 371/40 |
| 4,845,713 | 7/1989 | Zook | 371/37 |
| 4,857,859 | 8/1989 | Asahi et al. | 329/104 |
| 5,168,509 | 12/1992 | Nakamura et al. | 375/39 |
| 5,323,402 | 6/1994 | Vaccaro et al. | 371/37.1 |
| 5,513,133 | 4/1996 | Gressel et al. | 364/754 |
| 5,729,636 | 3/1998 | Kagawa et al. | 382/274 |
| 5,742,530 | 4/1998 | Gressel et al. | 364/746 |

*Primary Examiner*—Thien M. Le
*Assistant Examiner*—Douglas X. Rodriguez
*Attorney, Agent, or Firm*—Nicholas C. Hopman; Gary J. Cunningham

[57] ABSTRACT

A polynomial calculator device is applied to calibrate a sensing device. Preferably the sensing device (100) includes a sensing element (102) with an output coupled to a signal conditioning circuit (104). The signal conditioning circuit (104) is adapted to be highly computationally efficient and operable for compensating for temperature and part-to-part variation on the sensing element output for providing a useable sensor output signal. A calibration method relies on a unique polynomial calculator (118) that is implemented as part of the signal conditioning circuit (104). The sensor is preferably manufactured and packaged prior to calibration so as to avoid any post-calibration processing error. The packaged sensor is calibrated and a number of calibration values are retained in a memory (114) and accessed by the calibration method during sensing element signal processing.

23 Claims, 7 Drawing Sheets

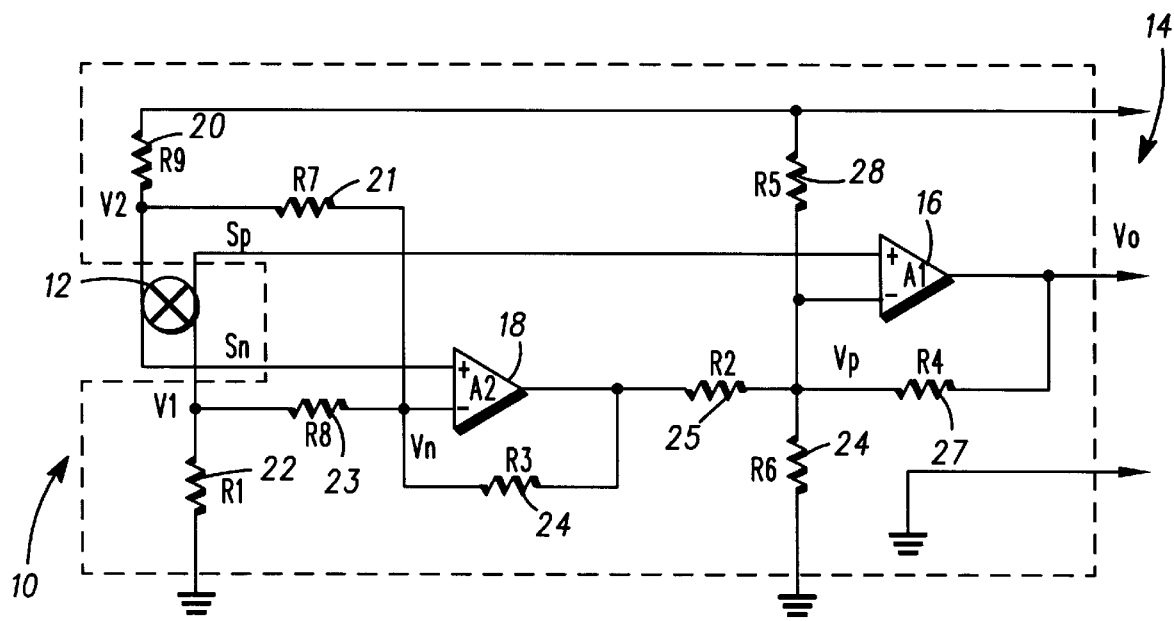
FIG.1 — PRIOR ART —
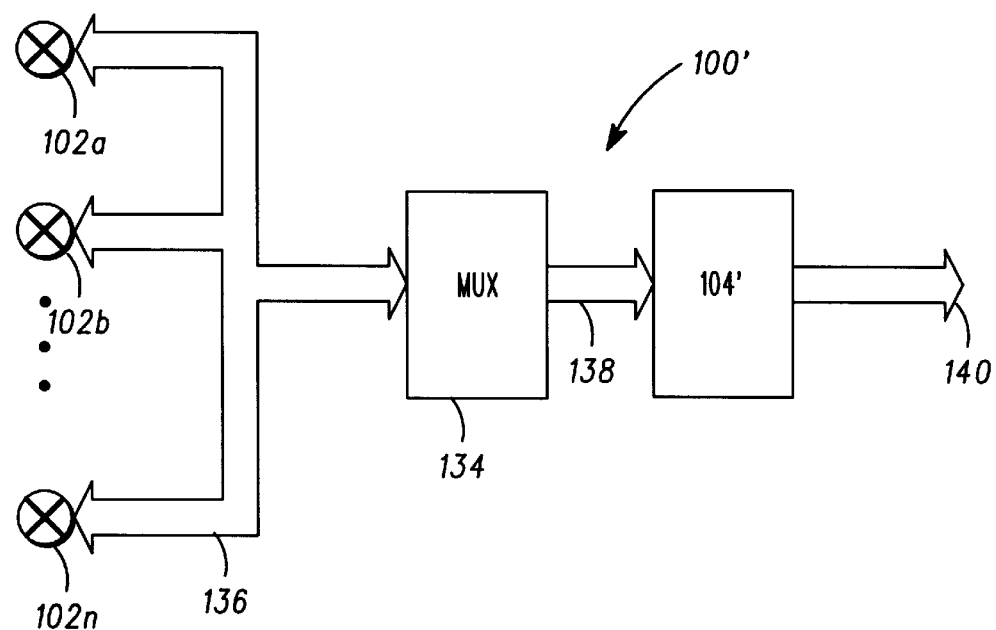
FIG.12

POLYNOMIAL CALCULATOR DEVICE, AND METHOD THEREFOR

FIELD OF THE INVENTION

The present invention relates generally to polynomial calculating devices that are preferably coupled to sensors and more particularly used to calibrate sensors.

BACKGROUND OF THE INVENTION

The world is full of sensor devices for detecting physical phenomenon and for providing a signal in response to the phenomenon. For example, a thermometer converts the physical condition temperature into a visual signal, a height of mercury in a glass column. Another example of a temperature-sensing device is a thermocouple which converts the physical condition temperature into an electrical signal. To be useful the sensor signal has to be understood to correspond with a particular physical phenomenon. For example, the thermometer has lines on the glass column to indicate the degrees of temperature. The lines, of course, have to be in the correct locations on the glass column to have meaning, and the process by which the lines are properly located is known as calibration. During calibration the sensor is subjected to a known physical condition or conditions and its response is observed. Observing the response of the sensor to the known conditions allows one to predict the sensor response for a wide range of conditions.

Pressure sensors are devices that provide a signal indicative of pressure, for example, the amount of air pressure within a tire. As with other types of sensors, pressure sensors require calibration to be useful. A specific kind of pressure sensor known as a piezoresistive pressure sensor provides a voltage signal indicative of a sensed pressure. The piezoresistive pressure sensor poses a number of problems in application. For example, the piezoresistive sensing element provides a relatively low level voltage signal. In addition, the piezoresistive sensing element may provide a signal that is sensitive to changing temperature and that does not change linearly with changing pressure. Moreover, the signal voltage characteristic from one sensing element to another sensing element may not be consistent. Therefore, special signal conditioning circuitry is required for a sensor product that provides a high level sensor output that is sufficiently accurate across a wide range of operating temperatures and pressures. Importantly, the device has to be capable of mass production, at low cost and with a high degree of part-to-part repeatability.

Most low cost signal conditioning approaches use analog circuits that are adjusted during a calibration process, typically during manufacture of the sensor. For example, it is known to use amplifier circuits coupled to resistor networks. In one such application, the resistor network includes a number of resistive elements coupled by fusible links. Though limited in the degree of adjustment available, various resistive values may be established for providing an acceptable output from the amplifier network. In another application, the resistor network includes laser trimmable resistive elements. During a calibration process, the resistive elements are trimmed using a laser to achieve the correct resistive values to provide an acceptable output from the amplifier network. In either application access to the circuit may be required during processing in order to fuse links and/or laser trim components. Hence manufacturing processing options are limited. Also, in certain applications offset, sensitivity and linearity may be difficult to compensate for independently. Furthermore, processing activities following calibration may introduce error that can not be corrected in the final product. And, the laser trim process requires expensive processing hardware and suffers increased cycle time.

An alternative design provides for electronic calibration of the sensing element. Sensors adapted for electronic calibration have included a microprocessor coupled to the sensor element via suitable signal conditioning circuitry and to a memory in which a calibration method is retained. During processing, the sensing element is tested under various known operating conditions. Calibration values are established and stored in the memory. In operation, the microprocessor in conjunction with the method and calibration values operates to provide a sensor output. Unfortunately, the microprocessor based approach is cost prohibitive and too physically large for a self-contained sensor device of the type typically found in automotive and similar applications. Other processing technologies, such as digital signal processors (DSPs), have not found successful implementation in low cost mass produced sensors owing to the high cost and complexity of general purpose DSP systems. For example, these solutions typically require a random-access memory (RAM) storage block and an arithmetic logic unit (ALU) consisting of a parallel multiplier, a parallel adder and associated circuitry. These elements are too large for cost effective implementation.

Therefore, there remains a need for a cost effective electronically calibrated sensing device. The preferred device will overcome processing limitations associated with fusing links and/or laser trimming components and will be computationally efficient so as to eliminate the need for expensive and large microprocessor components.

BRIEF DESCRIPTION OF THE DRAWINGS

FIG. 1 is a schematic diagram illustrating a typical prior art signal conditioning circuit coupled to a sensing element;

FIG. 12 is a block diagram of a sensor system in accordance with an alternate preferred embodiment of the present invention.

DETAILED DESCRIPTION OF THE PREFERRED EMBODIMENTS

Figure 2:
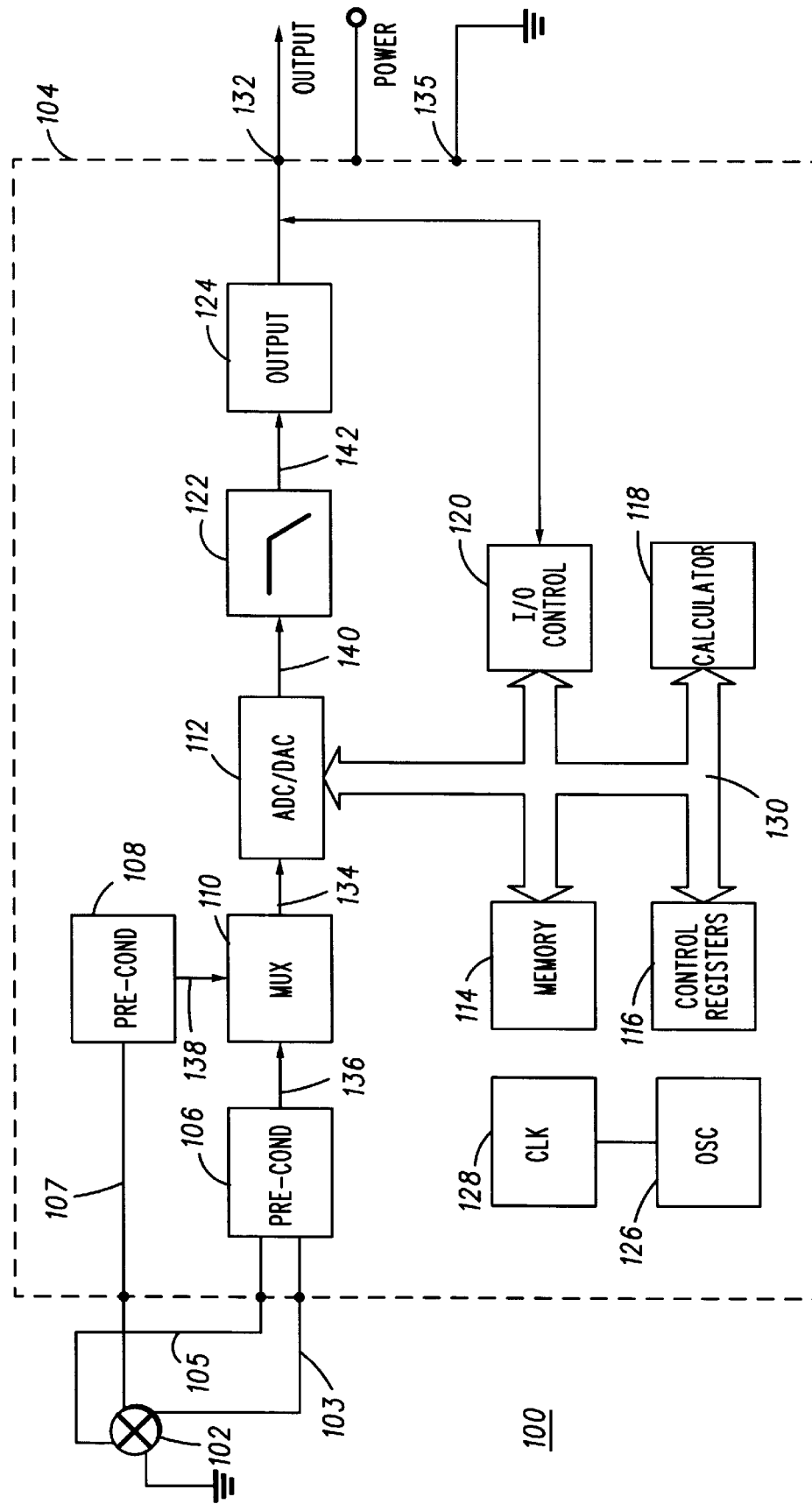
FIG. 2 is a block diagram showing a signal conditioning circuit in accordance with a preferred embodiment of the present invention.

In an electronically calibrated sensor a sensing element output is coupled to a calibration circuit. The calibration circuit is adapted to be highly computationally efficient and operable for temperature variation compensation, part-to-part variation compensation, linearizing and scaling of the sensing element output for providing a useable sensor output signal. A calibration method includes a unique polynomial solution which is implemented as part of the calibration circuit. The sensing device is preferably manufactured and packaged prior to calibration so as to avoid any post-calibration processing error. The packaged sensor is calibrated and a number of calibration values are retained in a memory portion of the calibration circuit and accessed by the calibration method during sensing element signal processing. It will be appreciated that the calibration circuit and polynomial solution have application to many sensor types, and no limitation should be drawn from the following discussion of a preferred, exemplary implementation in association with a piezoresistive pressure sensing device.

Referring to the drawings and particularly FIG. 1, a prior art sensor 10 is shown and includes a sensing element 12 coupled to a signal conditioning circuit 14 including amplifiers 16 and 18 and a plurality of resistor elements, 20–28. Amplifiers 16 and 18 and resistors 20–28 operate to condition and amplify the output of sensing element 12 for providing an acceptable output signal. In the prior art implementations, resistor elements 20–28 are typically thick film material deposited on a substrate onto which the sensing element semiconductor die is mounted or thin film material deposited directly onto the semiconductor die. During a calibration portion of the manufacturing process, the resistive material is laser trimmed to change its resistive value. While being the predominant design for a low cost, moderate to high performance sensing device, it suffers many processing and performance disadvantages. In alternate implementations, resistor elements 20–28 include a plurality of resistor values that are connected or isolated using fusible links to achieve a desired resistor value.

In FIG. 2, a sensor 100 in accordance with a preferred embodiment of the present invention is shown, and includes a sensing element 102 coupled to a signal conditioning circuit 104. The sensing element includes a temperature dependent pressure sensing element that provides both a pressure signal and a temperature signal. Note that the sensing element can be constructed either using a single sensor with separate pressure and temperature output signals, or using separate pressure and temperature sensors. Signal conditioning circuit 104 is preferably implemented as a single chip integrated circuit, and includes pressure signal pre-conditioning circuitry 106, a temperature signal pre-conditioning circuit 108, a multiplexer 110, an analog-to-digital/digital-to-analog converter (ADC/DAC) 112, an electronically erasable programmable read only memory (EEPROM) 114, control memory registers 116, a polynomial calculator 118, an input/output (I/O) controller 120, an output filter 122 and an output driver 124. The ADC/DAC 112 is preferably implemented as a combined analog-to-digital (ADC) and digital-to-analog (DAC) converter device. One of ordinary skill in the art will appreciate, however, that separate ADC and DAC devices may be implemented without departing from the fair scope of the present invention. Circuit 104 further includes an oscillator 126 coupled to a clock generator 128 having an output suitably coupled to the foregoing circuit elements as is known in the art. Furthermore, one of ordinary skill in the art will appreciate that in accordance with sound design practice circuit 104 will further include over-voltage protection, an operating voltage generator, power-on-reset function, and test logic (not shown).

Sensing element 102 is preferably a piezoresistive sensing element formed as a portion of a semiconductor die as is know in the art for providing a pressure indicative signal. In preferred implementations, sensing element 102 may be formed as a separate element and coupled to signal conditioning circuit 104 (as shown in FIG. 2) or may be formed integral as part of a processing circuit chip. Sensing element 102 further provides a temperature signal indicative of temperature of the sensing element 102. In an alternate preferred embodiment, a separate temperature sensing device may be included to provide the temperature signal. The output of sensing element 102 is a relatively low-level signal that generally varies with temperature and is subject to substantial part-to-part variation. The output of sensing element 102 may also include certain non-linear properties. Accordingly, the output of sensing element 102 is operated upon by signal conditioning circuit 104 for providing a temperature compensated substantially linear signal in a usable voltage range.

More specifically, pressure 103, 105 and temperature 107 output signals from sensing element 102 are coupled to pressure and temperature pre-conditioning circuitry 106 and 108, respectively, for initially filtering, amplifying and applying an offset to the sensing element's output signals 103, 105 and 107. The preconditioned pressure and temperature signals are then selectively coupled via multiplexer 110 to the ADC/DAC 112. ADC/DAC 112 operates on the pre-conditioned signals for providing, respectively, digital pressure and temperature signals.

The ADC/DAC 112 is preferably a ratiometric device. That is to say, ADC/DAC 112 operates proportionally to the supply voltage such that the output of sensor 100 remains proportional to the supply voltage.

Figure 3:
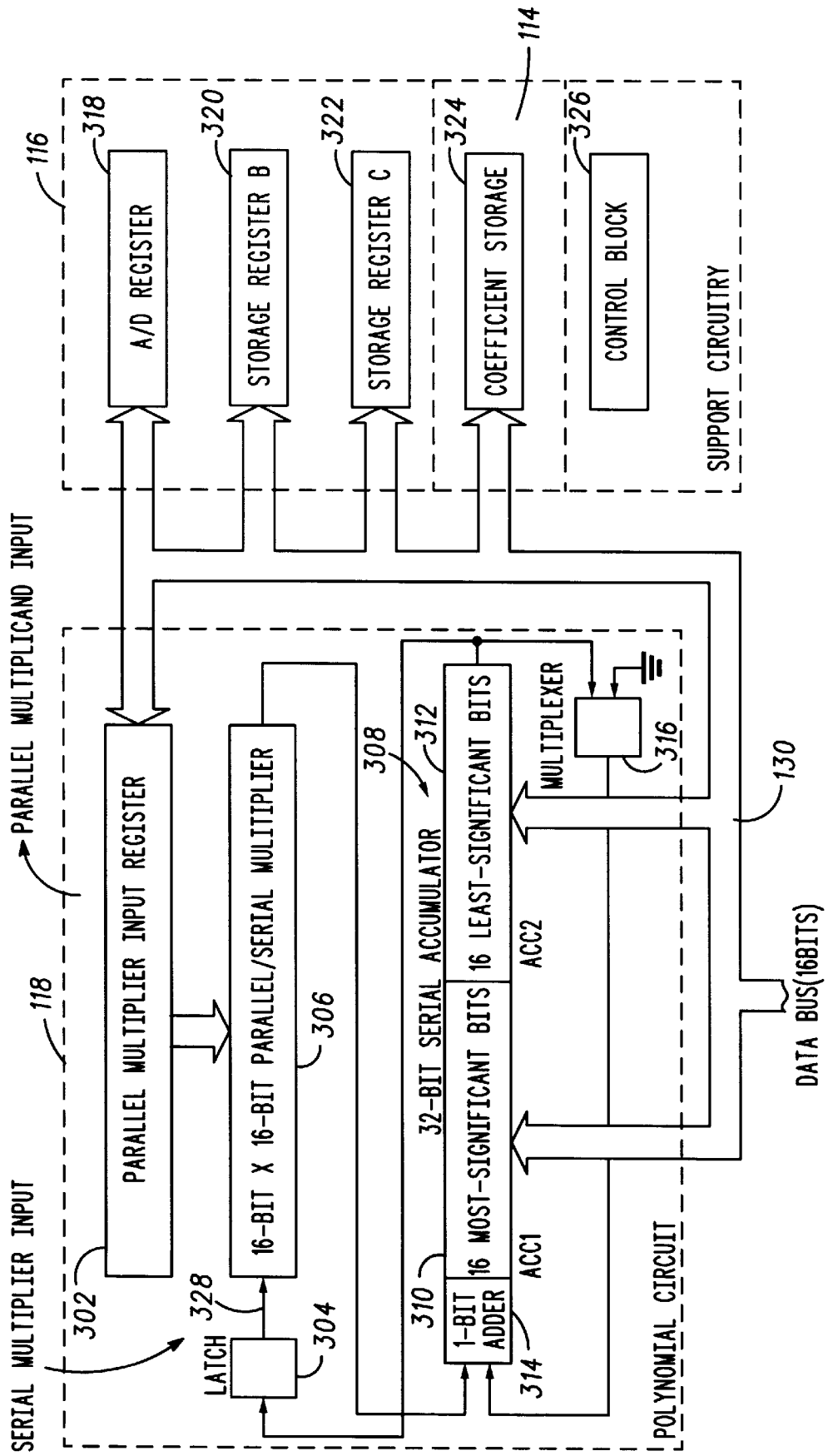
FIG. 3 is a block diagram illustrating a computationally efficient polynomial calculation circuit and adapted in accordance with a preferred embodiment of the present invention for use in the signal conditioning circuit of FIG. 2.

From ADC/DAC 112, the digital pressure and temperature signals are coupled via bus 130 to control registers 116 and polynomial calculator 118. As best seen in FIG. 3, control registers 116 include an analog-to-digital (A/D) register 318, storage register B, 320 and storage register C, 322. Each of registers 318–322 are coupled via bus 130 to polynomial calculator 118, ADC/DAC 112 and other related circuitry of signal conditioning circuit 104. EEPROM 114 includes a data storage portion and more particularly storage for a plurality of calibration coefficients 324. Output signals, from polynomial calculator 118 are coupled via bus 130 to ADC/DAC 112 where the digital signal is converted back to an analog output signal. The analog output signal is filtered using filter 122 and amplified for output by output driver 124. I/O control device 120 provides an ability to access and operate upon, such as writing to EEPROM 114, from external to sensor 100 while utilizing a minimum number of pins 132, 133 and 135.

With reference to FIG. 3, polynomial calculator 118 is described in more detail. In the preferred implementation, polynomial calculator 118 is implemented in a digital signal processing (DSP) circuit formed as part of signal conditioning circuit 104 in an ASIC device. More particularly, polynomial calculator 118 is a computationally efficient polynomial solution which is adapted for use in sensor 100 to eliminate use of analog circuit equivalents and the associated processing difficulties while overcoming the cost and size constraint limitations of a microprocessor based and other digital solutions. More particularly, to calibrate sensing element 102 output, polynomial calculator 118 under control of control block 326 executes the following polynomial:

$$V_O = a_0 + a_1 V_X + a_2 V_X^2 + (a_3 + a_4 V_X + a_5 V_X^2) V_Y + (a_6 + a_7 V_X + a_8 V_X^2) V_Y^2 \quad (a)$$

where $V_X$ is a disturbance variable input, and in the preferred embodiment is the digitized temperature signal and $V_y$ is the sensed condition, and in the preferred embodiment is the digitized pressure signal, and $V_O$ is the compensated digital output. Coefficients $a_0$–$a_8$ are determined during calibration processing and are used to compensate for: offset, sensitivity, nonlinearity, temperature coefficient of offset, temperature coefficient of sensitivity, temperature coefficient of nonlinearity, temperature nonlinearity of offset and temperature nonlinearity of sensitivity.

Equation (a) provides a compensated desired output for the sensed variable. The output is compensated for the effects of a disturbance variable and the sensing element properties. Of note is the independence of the calibration coefficients. In this regard, signal compensation for the disturbance variable as well as for sensing element properties may be independently compensated.

In accordance with a preferred embodiment of the present invention, polynomial calculator 118 is adapted to efficiently evaluate a polynomial of the general form:

$$(c_0 + c_1 K) \quad \text{(b)}$$

Recognizing, setting $V_X = V_T$ the digitized temperature signal and $V_Y = V_P$ the digitize pressure signal, that equation (a) may be factored to an equivalent equation of the form:

$$V_O = C + (B + AV_P) V_P \quad \text{(c)}$$

where:

$$C = a_0 + (a_1 + a_2 V_T) V_T \quad \text{(d)}$$

$$B = a_3 + (a_4 + a_5 V_T) V_T \quad \text{(e)}$$

$$A = a_6 + (a_7 + a_8 V_T) V_T \quad \text{(f)}$$

polynomial calculator 118 may be advantageously employed to provide a solution to equation (a) in a very computationally efficient manner by repeatedly evaluating equation (b).

With continued reference to FIG. 3, polynomial calculator 118 includes a 16-bit by 16-bit serial-parallel multiplier 306, a 1-bit adder 314 and a 32-bit serial accumulator 308 configured to be addressable in two 16-bit parallel segments 310 and 312, respectively. The digitized temperature and pressure signals are received from ADC/DAC 112 and are held in A/D register 318 before being loaded into a 16-bit parallel multiplier input register 302. Storage register B 320 and storage register C 322 provide temporary storage of intermediate values during operation of polynomial calculator 118. Control block 326 generates the necessary timing for circuit operation. Also shown and will be described in more detail are latch 304 and multiplexer 316. Note that multiplexer 316 is preferably constructed using a logical NAND gate. Hereforward multiplexer 316 will be simply referred to as a gate.

Figure 4:
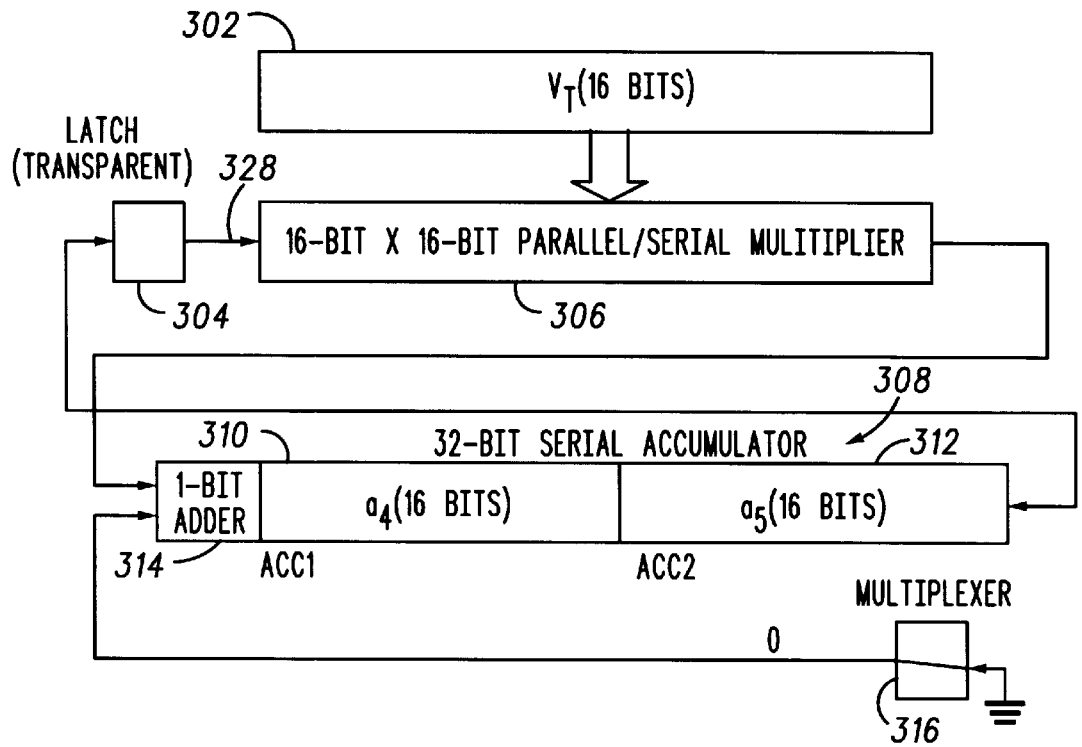
FIGS. 4–11 are circuit block diagrams showing, in sequential order, operation of the polynomial calculation circuit of FIG. 3 in accordance with a preferred embodiment of the present invention.
Figure 5:
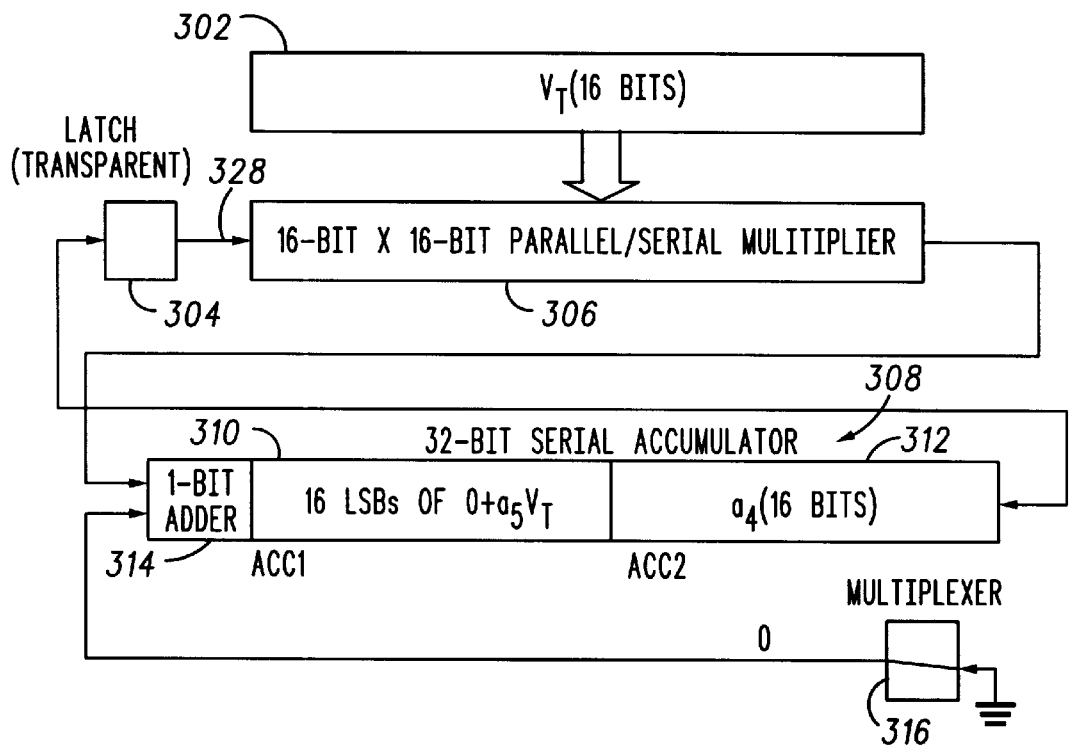

Referring now to FIGS. 4–11 operation of polynomial calculator 118 will be described in detail for evaluating an equation of the form of equation (e). It will be of course be appreciated, that evaluation of equations (c), (d) and (f) is accomplished in like manner. In FIG. 4, the $a_4$ input (that will be used as an addend term in the polynomial calculator 118) is loaded into the 16 most significant bits (MSBs) of accumulator 308, namely segment 310, $a_5$ (that will be used as a multiplier term in the polynomial calculator 118) is loaded into the 16 least significant bits (LSBs) of accumulator 308, namely segment 312, the multiplicand term $V_T$ is loaded from input register 302 into serial-parallel multiplier 306. Latch 304 is held transparent, and the gate 316 output is held to zero. In this configuration, LSB of segment 312 is connected to serial input 328 of multiplier 306. The serial output of serial-parallel multiplier 306 is connected to first input of adder 314 the output of which is connected to the MSB of segment 310. Accumulator 308 and serial-parallel multiplier 306 are clocked for 16 cycles. The result is shown in FIG. 5. The 16 LSBs of $a_5 V_T$ are serially shifted into the 16 MSBs of accumulator 308, segment 310, and $a_4$ has shifted into the 16 LSBs of accumulator 308, segment 312.

Figure 6:
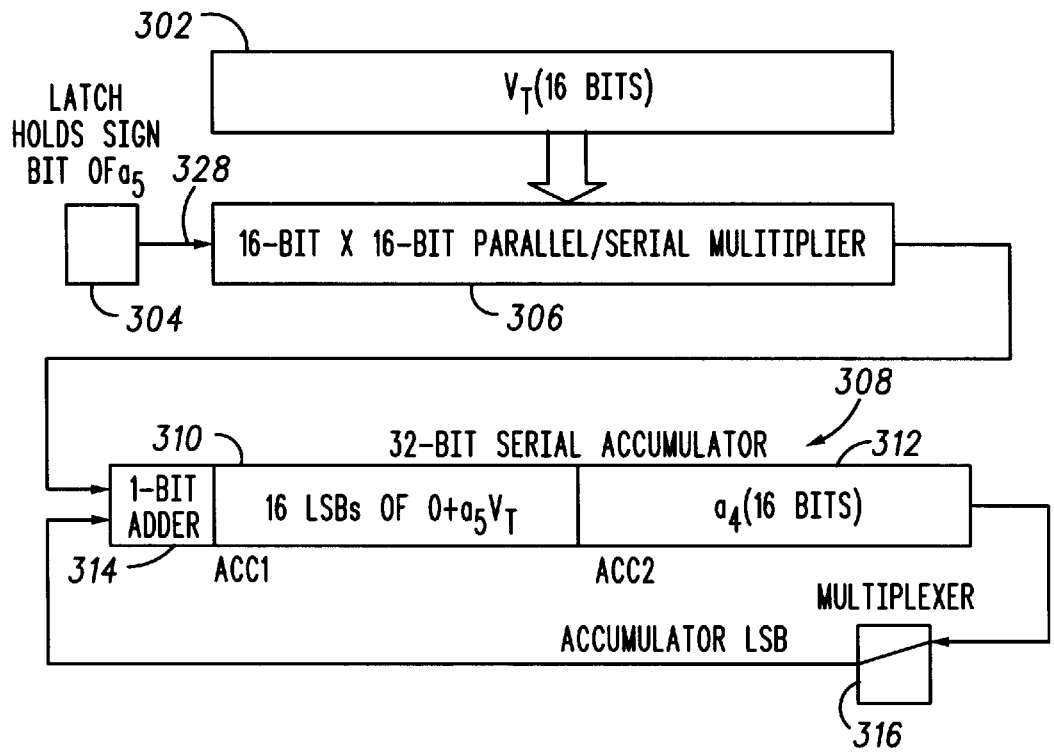
Figure 7:
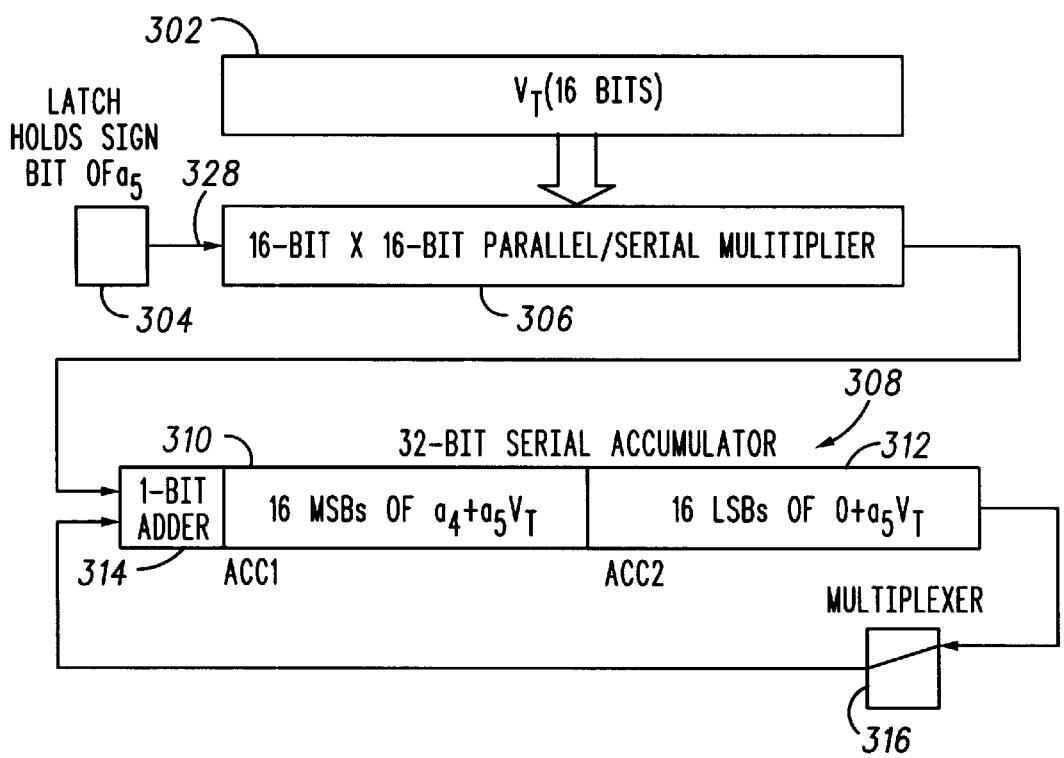

FIG. 6 shows how polynomial calculator 118 is then configured to add the addend term $a_4$. Latch 304 is set to hold the sign bit (MSB) of $a_5$. The gate 316 output is switched from zero to the LSB of accumulator 308, and the accumulator 308 LSBs, segment 312, is directed to the second input of adder 314. This allows $a_4$ (a 16 bit value) to be added to the 16 MSBs of $a_5 V_T$ as it is calculated during the next 16 clock cycles. FIG. 7 shows the result after a total of 32 clock cycles. The 32-bit value $a_4 + a_5 V_T$ result is complete and retained in accumulator 308.

Figure 8:
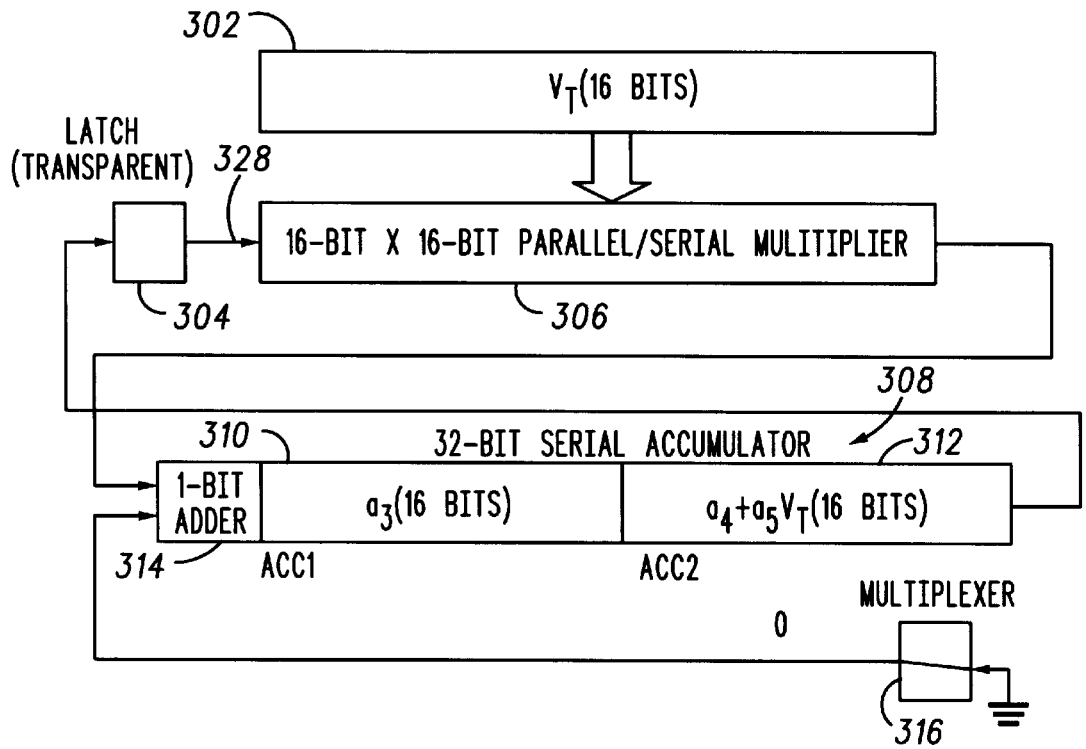
Figure 9:
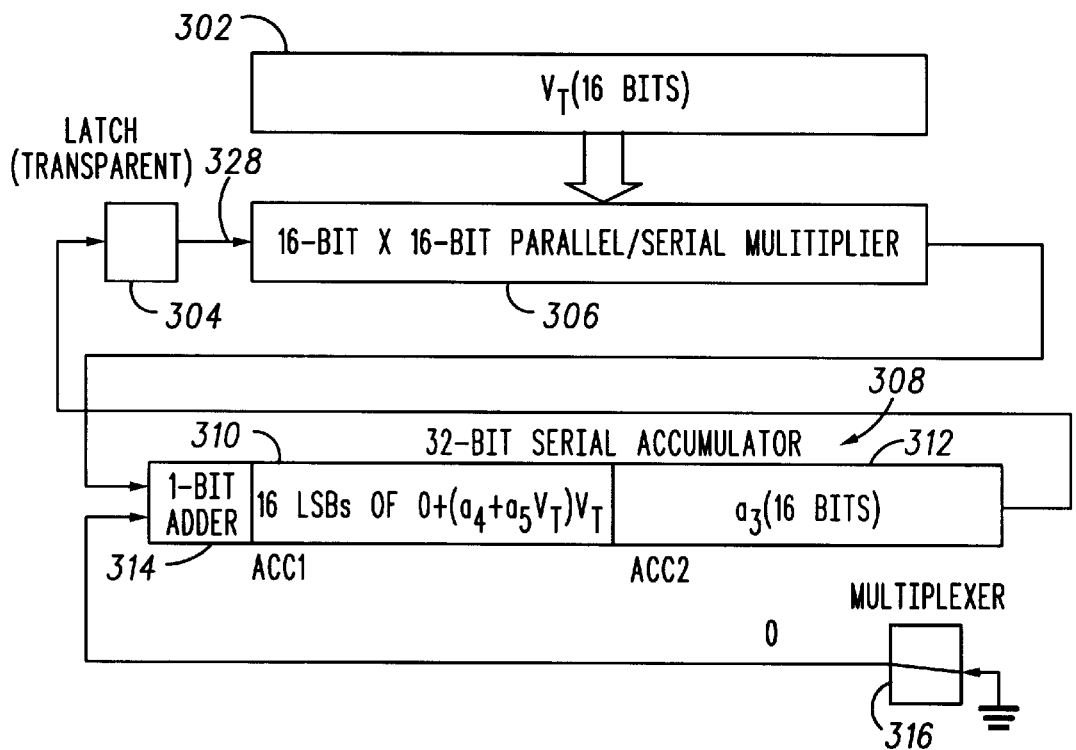

Referring to FIG. 8 this result is operated on to obtain the value $B = a_3 + (a_4 + a_5 V_T) V_T$. The 16 MSBs of $a_4 + a_5 V_T$, in segment 310, are transferred in parallel via bus 130 to segment 312 and $a_3$ is loaded into the 16 MSBs of accumulator 308, segment 310. The process illustrated in FIGS. 4–7 is repeated. Latch 304 is held transparent, and gate 316 output is held to zero. Accumulator 308 and multiplier 306 are then clocked for 16 cycles. FIG. 9 illustrates the result: the 16 LSBs of $(a_4 + a_5 V_T) V_T$ are in the 16 MSBs, segment 310, of accumulator 308, and $a_3$ has shifted into the 16 LSBs, segment 312, of accumulator 308.

Figure 10:
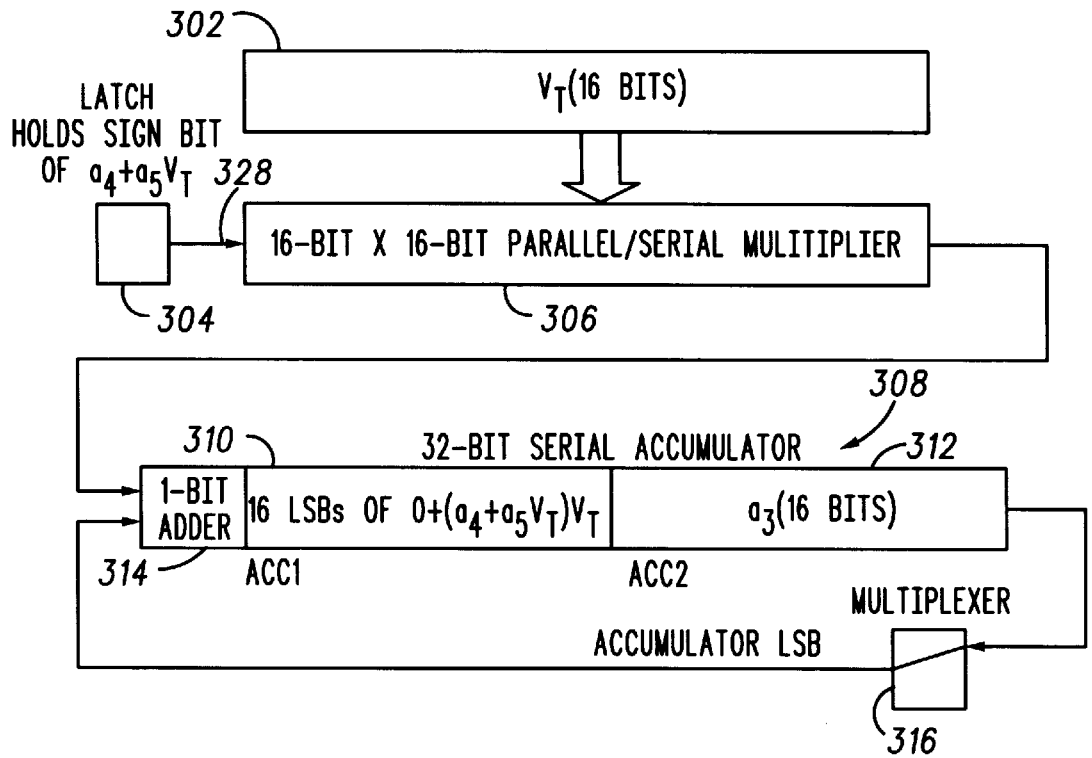
Figure 11:
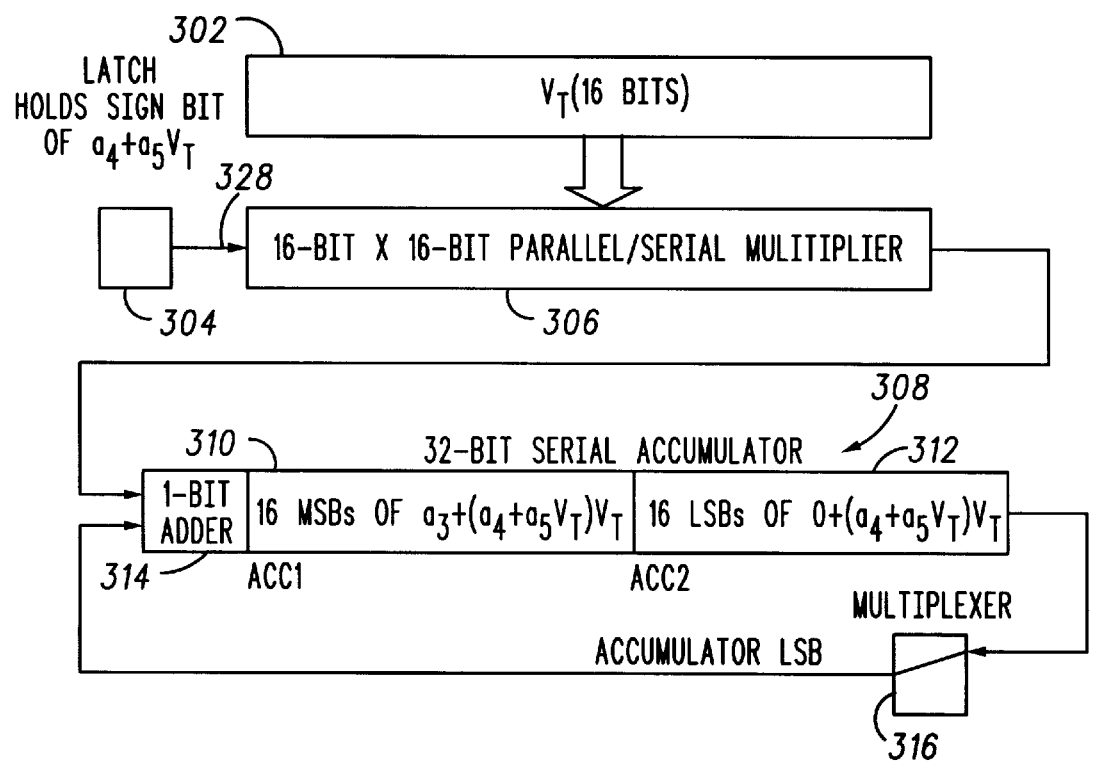

FIG. 10 shows how polynomial calculator 118 is then reconfigured to add $a_3$. The latch is set to hold the sign bit (MSB) of $a_4 + a_5 V_T$. Also, the gate 316 output is switched from zero to the LSB of accumulator 308. This allows $a_3$ (a 16-bit value) to be added to the 16-MSBs of $(a_4 + a_5 V_T) V_T$ during the next 16 clock cycles, and FIG. 11 illustrates the result. The 32-bit value $a_3 + (a_4 + a_5 V_T) V_T$, or value B, is now complete and retained in accumulator 308. The 16 MSBs of $a_3 + (a_4 + a_5 V_T) V_T$, in segment 310, are now transferred to storage register 320. And, in the same manner as described, value C is calculated and stored in storage register 322.

In accordance with the foregoing discussion, the values A, B and C are combined to evaluate equation (c). Value A is the last of the three values to be evaluated and accumulator 308 is advantageously employed to retain value A for later processing. In this manner, additional storage is not required for value A further lending to the efficiency of polynomial calculator 118. The 16 MSBs of A are transferred immediately, and in parallel, via bus 130 from segment 310 to segment 312. The value B is loaded into segment 310 and $V_P$, the digitized pressure signal, is loaded via A/D register 318 and input register 302 into serial-parallel multiplier 306. The result $B + AV_P$ is calculated as described above, and its 16 MSBs are transferred from segment 310 to segment 312. The value C is loaded into segment 310 and the final value $C + (B + AV_P) V_P$, or $V_O$, is calculated.

It is contemplated that storage registers 320 and 322 may be borrowed from other processing functions for use during polynomial evaluation so as not to significantly add to the die space required for the application. One of ordinary skill in the art will appreciate that the efficiency of polynomial calculator 118 provides a silicon efficient, and hence low power consumption, device which is easily packaged as part of a stand alone sensor device. Moreover, one of ordinary skill in the art will appreciate through the addition of storage registers, or preferably the temporary borrowing of storage registers from other operations, and adaptation of control block 326 evaluation of still higher order polynomial equations is easily accomplished.

Because no physical alteration of signal conditioning circuit 104 is required after manufacture for calibrating sensor 100, it is preferably manufactured and encapsulated within an environmentally robust package. As part of an end-of-line testing procedure, a packaged sensor is installed in a calibration test station. Electrical connections: output, power and ground are made to the sensor via pins 132, 133 and 135, and the sensor is subjected to a variety of known pressure and temperature conditions. The sensor output is observed and calibration coefficients are determined from the data and in accordance with equation (a). Given a plurality of data points, it is well within the skills of one ordinarily skilled in the art to derive appropriate calibration coefficients knowing equation (a). The sensor is then placed into a "write" mode, whereby EEPROM 114 is accessed, and the calibration coefficients are written thereto. With the calibration coefficients successfully written to EEPROM 114, the sensor is placed into an operative mode.

Sensor 100 is highly adaptable through changes in polynomial calculator 118 but more easily through the calibration process. As mentioned, polynomial calculator 118 is very easily adapted to evaluate even higher order polynomials. Using the calibration process to change calibration coefficients, sensor output may be altered as a function of pressure and temperature inputs. One of ordinary skill in the art will readily appreciate that sensor sensitivity, linearity, offset and performance over temperature may be uniquely set for a particular sensor application through appropriate selection of calibration coefficients. The electronic calibration process also allows for writing of an electronic identification such that each sensor may be uniquely identified in the field, which may be important in certain applications.

With reference to FIG.12, a sensor system 100' in accordance with an alternate preferred embodiment of the present invention and further illustrating the adaptability of the present invention is shown. Sensor system 100' is similar to sensor 100 with the exception that as opposed to a single sensing element 102 being coupled to signal conditioning circuit 104, a plurality of sensing elements, generally shown as 102*a*, 102*b* through 102*n* are coupled via signal bus 136 to a multiplexer 134 which respectively couples the sensing element outputs to signal conditioning circuit 104' via bus 138. Sensing elements 102*a*–102*n* may be generally any type of sensing element as previously described herein. Signal conditioning circuit 104' is generally the same as signal conditioning circuit 104 except that EEPROM 114 is expanded to retain calibration coefficients for each of the plurality of sensing elements. Multiplexer 134 is shown apart from signal conditioning circuit 104', but it is understood that it may be made part of signal conditioning circuit 104' without departing from the fair scope of the invention. As is appreciated from FIG. 12, sensor 100' is adaptable to evaluate the output of many different sensing operations as may be required for a particular application without substantially increasing the size of signal conditioning circuit 104' and by advantageously reusing polynomial calculation circuit 118 made part of signal conditioning circuit 104'.

The present invention has been described in terms of a preferred embodiment of an electronically calibrated piezoresistive pressure sensor. More particularly, the sensor of the present invention has been described to include a unique and highly adaptable polynomial calculator for providing a solution to a polynomial equation characterizing sensor performance. It will be readily understood that the present invention has application beyond the particular sensor described herein. For example, the present invention may be easily adapted for use with sensors detecting such physical variables as acceleration and chemical compositions.

Advantageously, the sensor 100 overcomes the previously stated limitations of the prior art including processing limitations associated with fusing links and/or laser trimming components and will be computationally efficient so as to eliminate the need for expensive and large microprocessor components.

What is claimed is:

1. A polynomial calculator device comprising:
   a serial-parallel multiplier with a multiplier parallel input, a serial input, and a serial output;
   a serial accumulator configured into first and second portions, the serial accumulator having an accumulator parallel input, a serial input, and a serial output coupled to the serial input of the serial-parallel multiplier;
   an adder having a first input coupled to the serial output of the serial-parallel multiplier, a second input coupled to the serial output of the serial accumulator, and an output coupled to the serial input of the serial accumulator; and
   a controller for loading a multiplicand term into the serial-parallel multiplier via the multiplier parallel input, the controller, via the accumulator parallel input, loading an addend term into the first portion of the serial accumulator and a multiplier term into the second portion of the serial accumulator, the controller shifting the multiplier term from the serial output of the serial accumulator into the serial input of the serial-parallel multiplier and forming a product of the multiplicand term and the multiplier term, the controller directing the product, from the serial output of the serial-parallel multiplier into the first input of the adder, and the addend term, from the serial output of the serial accumulator to the second input of the adder, and for transferring a sum of the product and the addend term into the first portion of the serial accumulator.

2. A polynomial calculator device in accordance with claim 1 further comprising a latch coupling the serial output of the serial accumulator to the serial input of the serial-parallel multiplier.

3. A polynomial calculator device in accordance with claim 2 wherein the latch operates in a transparent mode when the controller shifts the multiplier term from the serial output of the serial accumulator into the serial input of the serial-parallel multiplier.

4. A polynomial calculator device in accordance with claim 1 further comprising a gate coupling the serial output of the serial accumulator, and the second input of the adder.

5. A polynomial calculator device in accordance with claim 4 wherein the gate allows transfer of the addend term from the serial output of the serial accumulator to the second input of the adder, and prevents transfer of the contents of the second portion of the serial accumulator when the controller shifts the multiplier term from the serial output of the serial accumulator into the serial input of the serial-parallel multiplier.

6. A polynomial calculator device comprising:
   a sensing element providing a signal,
   a memory device containing a plurality of calibration constants;
   a serial-parallel multiplier with a multiplier parallel input, a serial input, and a serial output;
   a serial accumulator configured into first and second portions, the serial accumulator having an accumulator parallel input, a serial input, and a serial output coupled to the serial input of the serial-parallel multiplier;
   an adder having a first input coupled to the serial output of the serial-parallel multiplier, a second input coupled to the serial output of the serial accumulator, and an output coupled to the serial input of the serial accumulator; and
   a controller for loading a multiplicand term dependent on the signal provided by the sensing element into the serial-parallel multiplier via the multiplier parallel input, the controller, via the accumulator parallel input, loading an addend term dependent on one of the plurality of calibration constants contained in the memory device into the first portion of the serial accumulator and a multiplier term dependent on another of the plurality of calibration constants contained in the memory device into the second portion of the serial accumulator, the controller shifting the multiplier term from the serial output of the serial accumulator into the serial input of the serial-parallel multiplier and forming a product of the multiplicand term and the multiplier term, the controller directing the product, from the serial output of the serial-parallel multiplier into the first input of the adder, and the addend term, from the serial output of the serial accumulator to the second input of the adder, and for transferring a sum of the product and the addend term into the first portion of the serial accumulator.

7. A device in accordance with claim 6 further comprising output circuitry coupled to the first portion of the serial accumulator to provide an output signal indicative of the signal sensed by the sensing element dependent on the sum of the product and the addend term.

8. A device in accordance with claim 6 further comprising a latch coupling the serial output of the serial accumulator to the serial input of the serial-parallel multiplier.

9. A device in accordance with claim 8 wherein the latch operates in a transparent mode when the controller shifts the multiplier term from the serial output of the serial accumulator into the serial input of the serial-parallel multiplier.

10. A device in accordance with claim 6 further comprising a gate coupling the serial output of the serial accumulator, and the second input of the adder.

11. A device in accordance with claim 10 wherein the gate allows transfer of the addend term from the serial output of the serial accumulator to the second input of the adder, and prevents transfer of the contents of the second portion of the serial accumulator when the controller shifts the multiplier term from the serial output of the serial accumulator into the serial input of the serial-parallel multiplier.

12. A device in accordance with claim 11 wherein the serial accumulator comprises a recirculating serial accumulator.

13. A device in accordance with claim 12 wherein the sensing element comprises a temperature dependent pressure sensing element that provides both a pressure signal and a temperature signal.

14. A device in accordance with claim 13 wherein the pressure sensing element comprises a piezoresistive pressure sensing element.

15. A device in accordance with claim 6 wherein the sensing element comprises a temperature dependent pressure sensing element that provides both a pressure signal and a temperature signal.

16. A device in accordance with claim 15 wherein the pressure sensing element comprises a piezoresistive pressure sensing element.

17. A polynomial calculation method comprising the steps of:

sensing a physical phenomena and providing a sensed signal;

loading a multiplicand term, dependent on the sensed signal, into a serial-parallel multiplier;

loading an addend term from a memory device into a first portion of a serial accumulator and a multiplier term from the memory device into a second portion of the serial accumulator;

serially shifting the multiplier term from the serial accumulator into the serial-parallel multiplier and forming a product of the multiplicand term and the multiplier term while serially shifting the addend term into the second portion of the serial accumulator; and transferring a sum of the product and the addend term into the first portion of the serial accumulator.

18. A method in accordance with claim 17 further comprising the steps of:

providing an output signal indicative of the signal sensed in the step of sensing a physical phenomena, dependent on the sum of the product and the addend term and indicative of the physical phenomena sensed in the step of sensing.

19. A method of determining a pressure comprising the steps of:

providing a sensor package;

disposing a sensing element in the sensor package;

determining a plurality of calibration constants;

disposing a calibration circuit in the sensor package operatively coupled to the sensing element, the calibration circuit having a serial-parallel multiplier, a serial accumulator, an adder, calibration memory for holding the plurality of calibration constants, and a controller for directing the serial-parallel multiplier, the serial accumulator, the adder, and calibration memory to operate on a signal provided by the sensing element;

installing the sensor in an environment subjected to pressure changes; and generating the signal from the sensing element indicative of the pressure in the environment, wherein the controller directs the serial-parallel multiplier, the serial accumulator, and the adder, to multiply the signal by a first of the plurality of calibration constants, residing in the calibration memory, and to add the result to a second of the plurality of calibration constants residing in the calibration memory.

20. A method in accordance with claim 19 wherein the step of providing a sensor package comprises manufacturing a packaging material, and wherein the step of disposing the sensing element in the sensor package comprises encapsulating the sensing element in the packaging material.

21. A method in accordance with claim 19 wherein the step of determining a plurality of calibration constants follows the step of installing the sensing element in the sensor package.

22. A method in accordance with claim 19 wherein the sensing element comprises a temperature dependent pressure sensing element that provides both a pressure signal and a temperature signal.

23. The method of claim 22, wherein the sensing element comprises a piezoresistive pressure sensing element.

* * * * *